United States Patent
Zimmer et al.

(10) Patent No.: US 7,310,725 B2
(45) Date of Patent: Dec. 18, 2007

(54) COMMON PLATFORM PRE-BOOT AND RUN-TIME FIRMWARE SERVICES

(75) Inventors: Vincent J. Zimmer, Federal Way, WA (US); Michael A Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 495 days.

(21) Appl. No.: 10/882,465

(22) Filed: Jun. 30, 2004

(65) Prior Publication Data

US 2006/0005002 A1    Jan. 5, 2006

(51) Int. Cl.
*G06F 9/24* (2006.01)
(52) U.S. Cl. .......................................... 713/1
(58) Field of Classification Search ................. 713/1
See application file for complete search history.

(56) References Cited

U.S. PATENT DOCUMENTS

| 6,959,441 | B2 * | 10/2005 | Moore ..................... 719/328 |
| 7,082,509 | B2 | 7/2006 | Zimmer et al. |
| 7,082,523 | B2 | 7/2006 | Zimmer et al. |
| 7,146,609 | B2 * | 12/2006 | Thurston et al. ............ 717/169 |
| 7,165,170 | B2 | 1/2007 | Rothman et al. |
| 7,174,447 | B2 | 2/2007 | Zimmer et al. |
| 2004/0088531 | A1 | 5/2004 | Rothman |
| 2004/0123086 | A1 | 6/2004 | Rothman et al. |
| 2006/0020779 | A1 | 1/2006 | Rothman et al. |

\* cited by examiner

*Primary Examiner*—Rehana Perveen
*Assistant Examiner*—Eric Chang
(74) *Attorney, Agent, or Firm*—Blakely, Sokoloff, Taylor & Zafman LLP

(57) ABSTRACT

Common operations that are to be performed by various environment-specific entities are identified. The environments may include pre-boot environment and run-time environment. A common entity is established to include the common operations. The common entity may be stored in memory associated with system management mode (SMM). A system management interrupt (SMI) may be used by the various environment-specific entities to invoke the common entity.

11 Claims, 4 Drawing Sheets

COMMON PLATFORM PRE-BOOT AND RUN-TIME FIRMWARE SERVICES

FIELD OF INVENTION

The present invention generally relates to the field of software services. More particularly, an embodiment of the present invention relates to sharing common services with different environments.

BACKGROUND

On a given platform, there may be multiple instances of code that perform a similar task. For example, there is a separate real-mode code to support PC/AT basic input output system (BIOS) interfaces, protected mode code for extensible firmware interface (EFI), each with separate constructor sequences. This duplication may consume the limited firmware budget of a system, especially when the system is a mobile computer system where flash memory is typically limited.

BRIEF DESCRIPTION OF THE DRAWINGS

The invention may be best understood by referring to the following description and accompanying drawings that are used to illustrate embodiments of the invention. In the drawings.

DESCRIPTION

Figure 1:
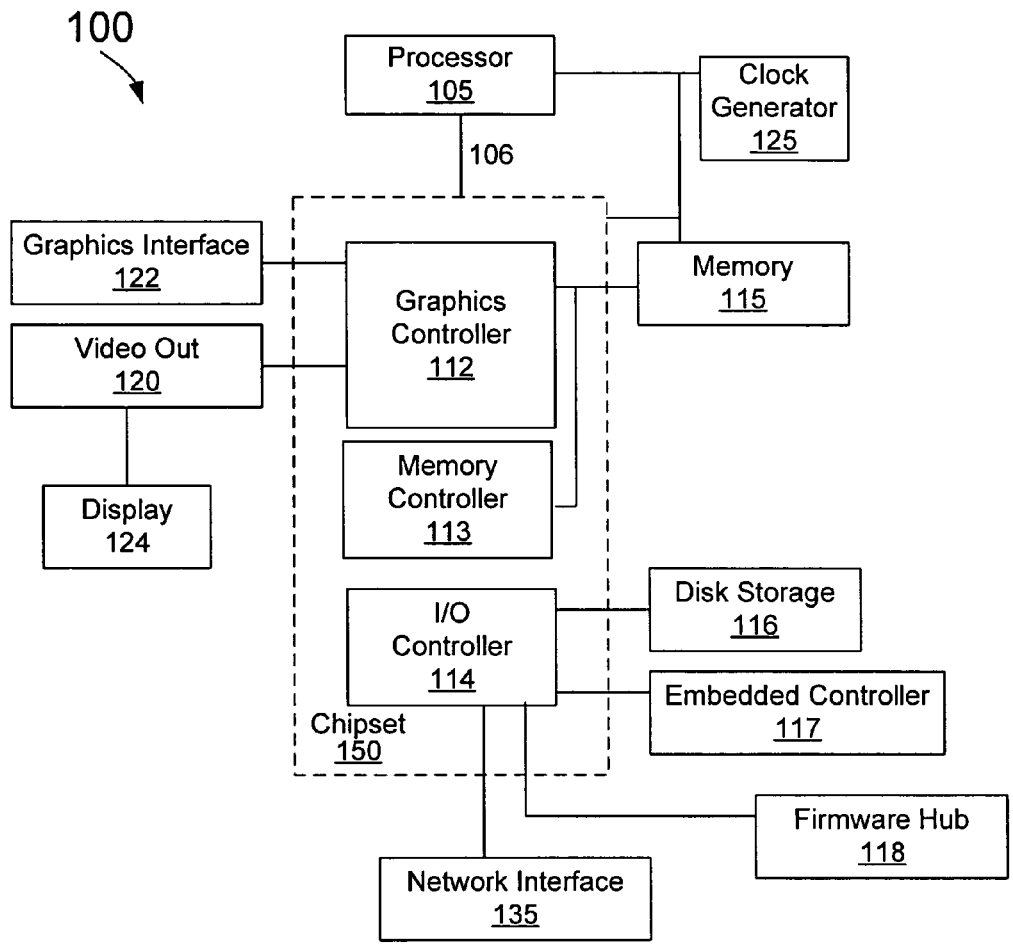
FIG. 1 is a block diagram illustrating an example of a computer system, in accordance with one embodiment.

For one embodiment, a method and system for processing common operations in a computer system is disclosed. A system management interrupt (SMI) is generated when the common operations are requested. A transfer to a common entity is performed. The common entity may include the common operations.

In the following description, for purposes of explanation, numerous specific details are set forth in order to provide a thorough understanding of the present invention. It will be apparent, however, to one skilled in the art that the present invention can be practiced without these specific details. Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe embodiments of the present invention in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Further, a design may go through various stages, from creation to simulation to fabrication. Data representing a design may represent the design in a number of manners.

First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

Computer System

FIG. 1 is a block diagram illustrating an example of a computer system, according to one embodiment. Computer system 100 may include a processor 105 and a chipset 150. The computer system 100 may also include a memory 115. The memory 115 may be, for example, dynamic random access memory (DRAM), synchronous dynamic random access memory (SDRAM), double data rate (DDR) SDRAM, etc. Although not shown, the computer system 100 may be powered by an alternating current (AC) power source or by a direct current (DC) power source using one or more batteries. The processor 105 may be coupled to bus 106 which may include, for example, address bus, bus control signals, data bus, etc. Although not shown, there may be other controllers in the computer system 100 that are capable of taking turns with the processor 105 at making access requests to the memory 115. This may allow a controller to drive the address bus and the control signals of the bus 106 with minimal intervention by the processor 105. For example, the processor 105 may be busy performing other tasks that do not require the bus 106, or the processor 105 may be idle in a low power state. A controller may contain its own processor or microcontroller or engine that generates requests to the memory 115. A controller may be, for example, an Ethernet controller, a sound transducer controller, a universal serial bus (USB) controller, a graphics controller, etc.

The chipset 150 may be an integrated graphics chipset. The chipset 150 may include an integrated graphics controller 112 to provide graphics/video support. The graphics controller 112 and the memory 115 may receive reference clock signals from a clock generator 125. The graphics controller 112, the memory controller 113 and the memory 115 may also include delayed locked loop (DLL) circuit(s) (not shown) used, for example, to control timings, etc. The graphics controller 112 may perform computations to get display data from the memory 115 and to output the display data to the display unit 124 via the video out port 120. The graphics controller 112 may also control other operational behaviors of the display unit 124 including, for example, refresh rates, backlight brightness and the like. The chipset 150 may also include a graphics interface 122 (e.g., Accelerated Graphics Port (AGP) interface) to support external graphics controllers (not shown) for advanced graphics capability.

The chipset 150 may include a memory controller 113 that interfaces with the memory 115 to satisfy read/write requests from the processor 105. The chipset 150 may also include an I/O controller 114 to interface with peripheral devices, which may include, for example, disk storage 116, network interface 135, embedded controller 117, firmware hub 118, etc. The disk storage 116 may include a machine-readable medium (not shown) on which is stored a set of instructions (e.g., software application) embodying any one, or all, of the embodiments described herein. The instructions may also reside, completely or at least partially, within the main memory 115 and/or within the processor 105. The instructions may furthermore be transmitted or received via the network interface 135.

Memory Map

Figure 2:
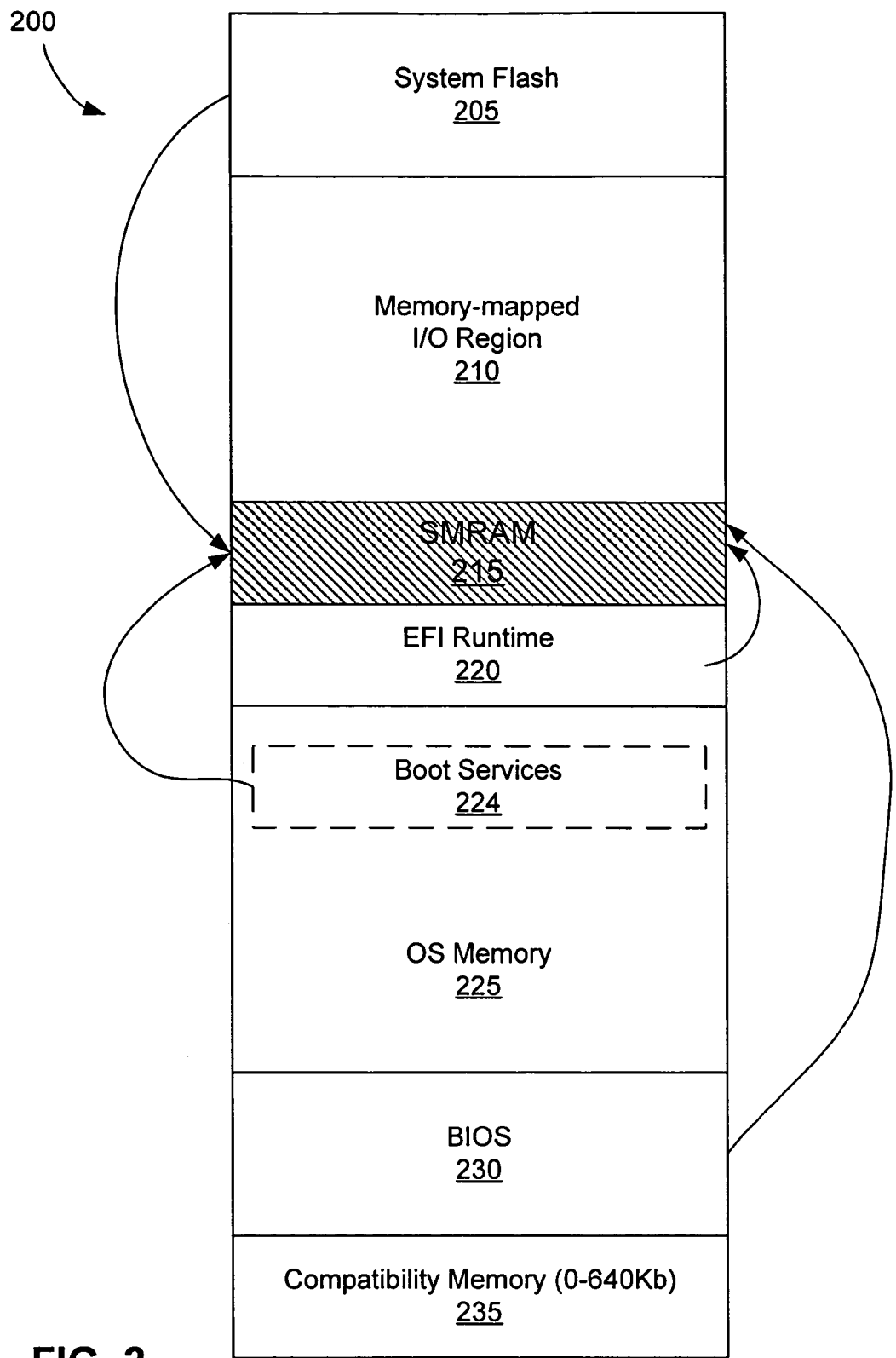
FIG. 2 is a block diagram illustrating an example of a memory map for a computer system that supports common services or operations using system management mode (SMM), in accordance with one embodiment.

FIG. 2 is a block diagram illustrating an example of a memory map for a computer system that supports common services or operations using system management mode (SMM), in accordance with one embodiment. Memory map 200 may be associated with the computer system 100 and may include multiple memory areas, with each memory area designated for a particular functionality. For example, the memory map 200 may include system flash area 205, memory-mapped input/output (I/O) area 210, system management memory or SMRAM area 215, extensible firmware interface (EFI) run-time area 220, boot services area 224, operating system (OS) area 225, basic input/output system (BIOS) area 230, and compatibility memory area 235. SMM, BIOS, and EFI are known to one skilled in the art.

There may be software or code entities residing in these various memory areas. Some of these software entities may perform the same or similar operations. For example, there may be software entities that support pre-boot operations while there may be similar entities that support run-time operations. Having different entities performing the same or similar operations may unnecessarily waste valuable memory space and may potentially deprive implementation of other functionalities.

Common Entity and System Management Mode (SMM)

For one embodiment, a common entity is established to perform the operations or services that are common to the different software entities. These software entities may be referred to as environment-specific entities because they may operate in different environments (e.g., pre-boot, run-time, etc.). For another embodiment, the common entity may be implemented using SMM and may be stored in SMM memory (or SMRAM).

Referring to the example in FIG. 2, the system flash area 205 may include an entity that performs the same operations as another entity residing in the boot services area 224. A common entity that performs the same operations as the entities in the system flash area 205 and the boot services area 224 may be established and stored in the SMRAM 215 (illustrated in the example as arrows pointing to the shaded area). Similarly, another common entity that performs the same operations as entities that reside in the EFI run-time area 220 and the BIOS area 230 may also be established and stored in the SMRAM 215.

According to one embodiment, in order to execute a common entity, each of the associated environment-specific entities that perform the same or similar operations may need to be modified (or stubbed out) such that a SMI is initiated whenever these similar operations are to be executed. For example, an environment-specific entity in the system flash area 205 that performs operations to read from the disk storage 116 may be modified to initiate a SMI to execute a common entity that performs the read disk operations. Similarly, an environment-specific entity in the boot services area 224 may also be modified to initiate the same SMI whenever the read disk operations are necessary.

It may be noted that the process of initiating the SMI, and transitioning to and from the SMM (including the storing and restoring of system states) may be associated with some latency as compared to the normal execution of the same operations without using the common entity. However, this latency may be minimal comparing to the actual time it may take for the execution of the operations to complete, especially when the operations relate to I/O operations.

One advantage of the techniques described herein is that services previously available to only one environment (e.g., BIOS pre-boot) may now be used by another environment (e.g., EFI run-time). It may be noted that because embodiments of the present invention support different environments, it may be necessary to provide information to the common entity to indicate which environment the common entity is supporting. For example, registers may be used to pass environment information, commands, or any other information to the common entity.

Common Entity Process

Figure 3:
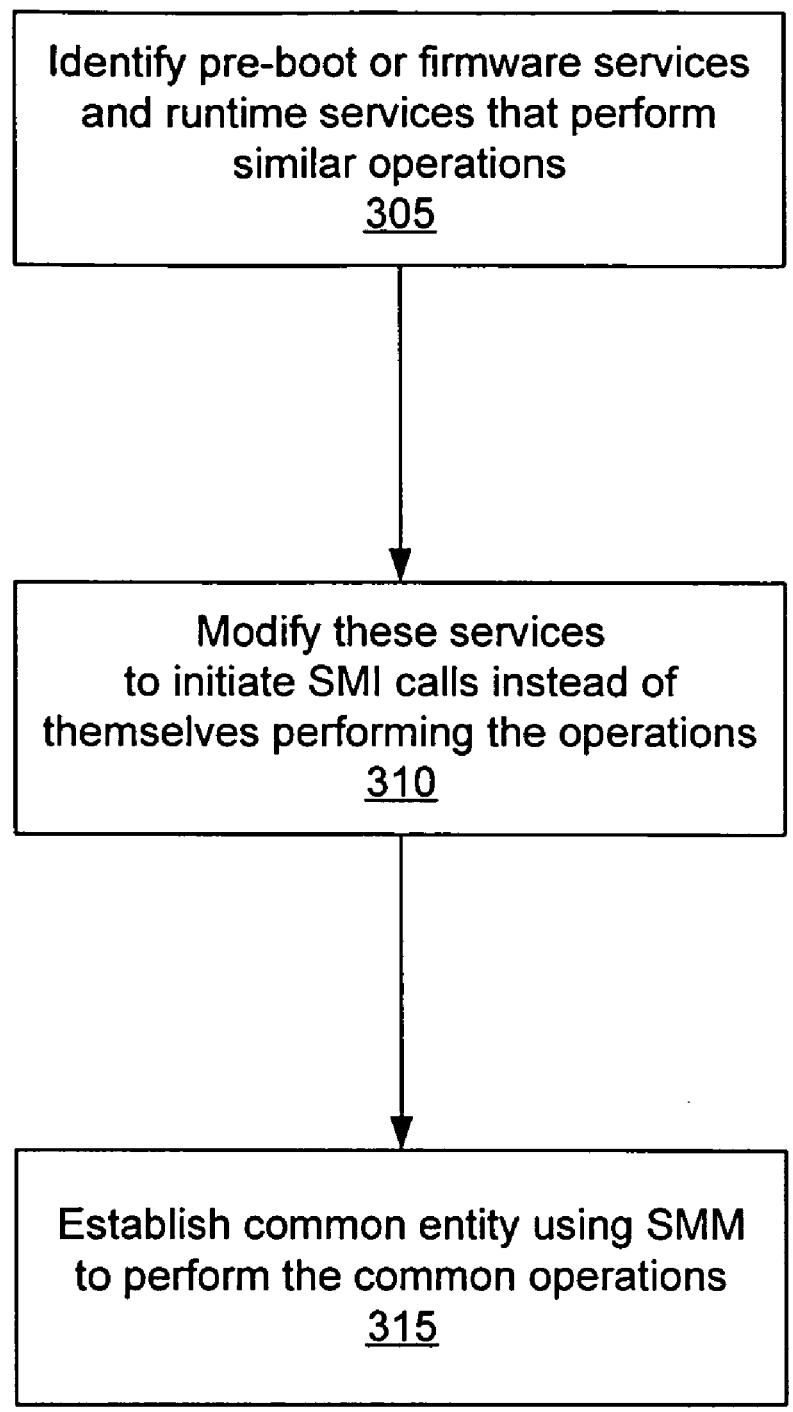
FIG. 3 is a flow diagram illustrating an example of a process used to implement common entities using SMM, in accordance with one embodiment.

FIG. 3 is a flow diagram illustrating an example of a process used to implement common entities using the SMM, in accordance with one embodiment. At block 305, environment-specific entities in the same or different environments that perform similar operations are identified. At block 310, the similar operations that would be performed by the various environment-specific entities are modified such that, instead of performing the operations, a call or transfer to a common entity is initiated. In the example where the SMM is used, this call may be implemented as a SMI. At block 315, a common entity that is capable of performing operations similar to the operations that would be performed by the various environment-specific entities is established and stored in a common area. In the example where the SMM is used, this common area may be the SMM memory. Thus, whenever an environment-specific entity is to perform operations that have been identified as being included in the common entity, a transfer to the common area occurs to execute the common entity. Upon execution completion of the common entity, a transfer back to the environment-specific entity may occur and normal operation of the environment-specific entity may resume.

Figure 4:
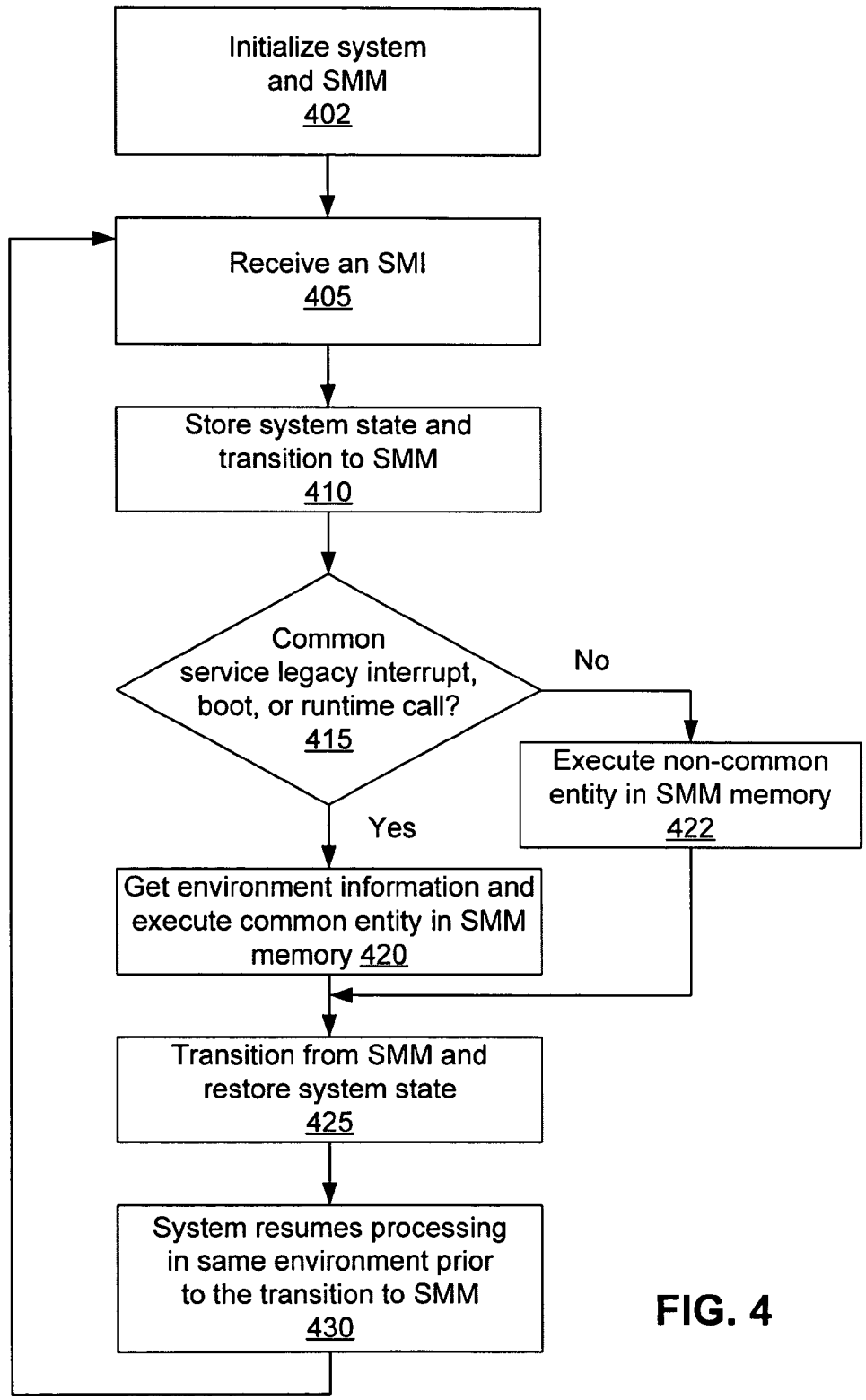
FIG. 4 is a flow diagram illustrating an example of a process used when a common entity is requested, in accordance with one embodiment.

FIG. 4 is a flow diagram illustrating an example of a process used when a common entity is requested, in accordance with one embodiment. In this example, the SMM is used to support the common entities. At block 402, the computer system and the SMM are initialized. The computer system may be initialized due to warm boot, cold boot, or wake up events. The SMM may be initialized to establish the common entities in the SMM memory. Other operations may also be performed to prepare the computer system and the various environment-specific entities as described in FIG. 3.

At block 405, a SMI is received. The SMI may be received when executing an environment-specific entity that would perform operations that are included in the common entity. At block 410, the system state is stored to prepare for the transition to the SMM. At block 415, a test is performed to determine if the SMI is to invoke a common entity or a non-common entity. The non-common entity may be any entity that is to be performed within the SMM but may not be related to the common operations. If the SMI is associated with a non-common entity, the process may flow from block 415 to block 422 where codes associated with the non-common entity are executed. From block 415, if the SMI is associated with a common entity, the process may flow to block 420 where the common entity is executed. This may include the common entity receiving environment information from the associated environment-specific entity. At block 425, a transition from SMM occurs and the system state is restored. The computer system may then resume its operation in the same environment prior to the transition to SMM, as shown in block 430.

Computer Readable Media

It is also to be understood that because embodiments of the present invention may be implemented as one or more software programs, embodiments of the present invention may be implemented or realized upon or within a machine readable medium. For example, the process of identifying common operations, establishing common entities, etc. (as described in FIG. 3 and FIG. 4) may be implemented in software and the instructions associated with this process may be stored in a machine readable medium.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
identifying common operations in two or more environment-specific entities, wherein the two or more environment-specific entities are associated with similar or different operating environments, the operating environments including a pre-boot environment and a run-time environment;
replacing the common operations in the two or more environment-specific entities with an operation that causes transfer to a common entity; and
executing the common entity whenever the common operations in the two or more environment-specific entities are to be executed, wherein the common entity includes the common operations and is stored in a system management mode (SMM) memory.

2. The method of claim 1, wherein replacing the common operations in the two or more environment-specific entities with an operation that causes the transfer to common entity comprises using a system management interrupt (SMI).

3. The method of claim 2, wherein replacing the common operations further comprises providing environment information to the common entity.

4. A system, comprising:
a processor; and
system management mode (SMM) memory coupled to the processor to store one or more common entities, wherein a common entity includes common operations that are performed by two or more environment-specific entities that are to invoke the common entity to execute the common operations, wherein the two or more environment-specific entities comprise entities operating in a pre-boot environment and in a run-time environment.

5. The system of claim 4, wherein the two or more environment-specific entities invoke the common entity using system management interrupt (SMI).

6. A method, comprising: using system management mode (SMM) memory to support common operations used by entities operating in different environments, the different environments comprising pre-boot environment and run-time environment, wherein the entities operating in the different environments are to be modified to not include the common operations and to include an operation to invoke the common operations supported by the SMM.

7. The method of claim 6, wherein the entities operating in the different environments are to be modified to provide environment information to the common operations supported by the SMM.

8. A machine-readable storage medium providing instructions, which when executed by a set of one or more processors, causes said set of processors to perform a method, comprising:

identifying common operations in two or more environment-specific entities in a system, wherein the two or more environment-specific entities operate in different environments, the different environments including pre-boot environment and run-time environment;

using system management mode (SMM) memory to store the identified common operations;

replacing the common operations associated with the two or more environment-specific entities with an operation that transfers to the SMM; and executing the common operations associated with the SMM memory instead of the common operations associated with the two or more environment-specific entities.

9. The machine readable medium of claim 8, wherein the operation that transfers to the SMM is a system management interrupt (SMI).

10. The machine readable medium of claim 9, wherein the operation that transfers to the SMM include an operation that provides environment information to the common operations associated with the SMM memory.

11. The machine readable medium of claim 8, wherein the common operations associated with the two or more environment-specific entities occupy different areas of a memory map associated with the system.

* * * * *